(12) United States Patent
Yerram et al.

(10) Patent No.: US 11,815,018 B2
(45) Date of Patent: Nov. 14, 2023

(54) BOX-SHAPED AIR INTAKE SILENCER WITH VERTICAL BAFFLES FOR GAS TURBINE SYSTEM

(71) Applicant: GENERAL ELECTRIC COMPANY, Schenectady, NY (US)

(72) Inventors: Ravinder Yerram, Sugar Land, TX (US); Quoc Hoai Nguyen, Friendswood, TX (US); Balakrishnan Ponnuraj, Sugar Land, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/551,935

(22) Filed: Dec. 15, 2021

(65) Prior Publication Data

US 2023/0184164 A1 Jun. 15, 2023

(51) Int. Cl.
*F02C 7/045* (2006.01)
*F01D 25/04* (2006.01)

(52) U.S. Cl.
CPC .............. *F02C 7/045* (2013.01); *F01D 25/04* (2013.01); *F05D 2220/32* (2013.01); *F05D 2260/962* (2013.01)

(58) Field of Classification Search
CPC ......... F02C 7/04; F02C 7/045; F05D 2260/96
See application file for complete search history.

(56) References Cited

U.S. PATENT DOCUMENTS

| | | | | |
|---|---|---|---|---|
| 3,511,337 A | * | 5/1970 | Pease | F02C 7/24 55/482 |
| 4,204,586 A | * | 5/1980 | Hani | F02M 35/1211 181/269 |
| 4,753,319 A | | 6/1988 | Vinciguerra | |
| 5,728,979 A | * | 3/1998 | Yazici | F24F 7/08 181/224 |
| 6,945,355 B2 | * | 9/2005 | Ludwig | F16L 55/033 454/262 |
| 8,087,491 B2 | | 1/2012 | Merchant et al. | |

(Continued)

FOREIGN PATENT DOCUMENTS

GB 670930 4/1952

OTHER PUBLICATIONS

European Search Report dated Apr. 26, 2023 from corresponding European Application No. 22209736.2.

*Primary Examiner* — Thuyhang N Nguyen
(74) *Attorney, Agent, or Firm* — Grogan, Tuccillo & Vanderleeden, LLP

(57) ABSTRACT

A box-shaped air intake silencer with vertical baffles for a gas turbine system. The box-shaped silencer has a silencer housing having opposing ends with a first end closed and a second end opened to permit passage of air. Opposing sidewalls extend between the first end and the second end with each of the sidewalls operative to receive a perpendicular flow of intake air. A silencer having vertically, spaced baffles are disposed within the housing. A first end of the baffles face the first end of the housing and a second end of the baffles faces the second end of the housing. Each of the baffles extend horizontally between the first end and the second end of the housing. The baffles receive the perpendicular flow of intake air proximate the first end of the housing and direct the intake air towards the second end of the housing for passage therethrough.

19 Claims, 5 Drawing Sheets

(56) References Cited

U.S. PATENT DOCUMENTS

| | | | |
|---|---|---|---|
| 8,579,074 B2* | 11/2013 | Kosaka | F02C 7/045 |
| | | | 181/224 |
| 9,309,842 B2* | 4/2016 | Watson | F04D 29/668 |
| 9,546,582 B1 | 1/2017 | Zhang et al. | |
| 10,119,469 B2 | 11/2018 | Ponyavin et al. | |
| 10,184,397 B2 | 1/2019 | Austin et al. | |
| 10,316,692 B2* | 6/2019 | Yoshida | F02B 37/04 |
| 10,385,778 B2 | 8/2019 | Zhang et al. | |
| 2003/0072648 A1 | 4/2003 | Han et al. | |

* cited by examiner

BOX-SHAPED AIR INTAKE SILENCER WITH VERTICAL BAFFLES FOR GAS TURBINE SYSTEM

BACKGROUND

Technical Field

Embodiments of this disclosure relate generally to turbomachines, and more specifically, to a box-shaped air intake silencer with vertical baffles for use with a gas turbine system.

Discussion of Art

Conventional turbomachines, such as gas turbine systems, are typically utilized for electric power generation or as mechanical drives for operating equipment. A conventional gas turbine system basically includes a gas turbine engine having a compressor, a combustor and a turbine. In general, the conventional gas turbine system can generate power or drive a load by drawing aft into the compressor section of the gas turbine engine. The compressor pressurizes the air and feeds it at high speeds to the combustor which mixes the pressurized air with a steady stream of injected fuel and burns the mixture. The combustion of the pressurized air and fuel produces a high temperature, high pressure gas stream that enters the turbine section and expands while flowing through a fluid flow path in the turbine. As the combustion gas expands through the turbine section, it spins a number of rotating blades. Because a turbine section is typically coupled to the compressor and a load (e.g., a generator) through a rotating shaft, the spinning of the rotating blades will drive the compressor to draw more pressurized air into the combustor, and turn the load (e.g., drive a generator to produce electricity).

In order to draw the air into a gas turbine system, the compressor typically utilizes an air intake system. The air intake system may include an air inlet duct for drawing inlet air. A filtration system can prevent contaminates or debris (e.g., dust, sand, dirt, foreign object debris) in the inlet air from entering the compressor. Air taken into a gas turbine system for combustion often creates significant noise. As a result, the air intake system typically includes a silencer system for minimizing the noise created during operation of the gas turbine system. In particular, this silencer system provides sound attenuation for the air intake system during operation, and can aid in providing the inlet air to the compressor during operation of the gas turbine system. In order to diminish sound emitted during operation of the air intake system, a silencer component and/or a silencer housing of the silencer system is typically lined with a sound attenuating material or insulation (i.e., a material with acoustically absorptive properties) for minimizing the noise.

By utilizing sound attenuating materials within the silencer system, the flow properties of the fluid (i.e., the inlet air) may be negatively affected, resulting in a decrease of efficiency within the compressor and ultimately a decrease in efficiency of the gas turbine system. More specifically, as the fluid passes through the silencer system and over the sound attenuating materials, the fluid may experience changes in temperature, flow velocity, and/or flow pressure. For example, the flow path of the fluid through the silencer system can result in changes that may increase pressure loss in the fluid flow, and decrease the efficiency of the compressor. One way of avoiding pressure loss in the fluid flow is to build a large air intake system, and specifically a large silencer system, to allow the fluid to move freely through the air intake system toward the compressor section. However, large air intake systems may be costly to build and may limit the positioning of the gas turbine system due to the size of the air intake system. Smaller air intake systems with a small silencer system have been utilized as alternatives to the large air intake systems, but these smaller air intake systems typically are heavy and complicated in their designs, making it difficult and expensive to manufacture.

BRIEF DESCRIPTION

The following presents a simplified summary of the disclosed subject matter in order to provide a basic understanding of some aspects of the various embodiments described herein. This summary is not an extensive overview of the various embodiments. It is not intended to exclusively identify key features or essential features of the claimed subject matter set forth in the Claims, nor is it intended as an aid in determining the scope of the claimed subject matter. Its sole purpose is to present some concepts of the disclosure in a streamlined form as a prelude to the more detailed description that is presented later.

The aforementioned drawbacks associated with the typical air intake systems used in a gas turbine system to draw inlet air, and in particular, the silencer systems of these air intake systems, create the need for a smaller silencer system with reduced weight that occupies less space, not complicated in design, and easy and economical to manufacture, while at the same time providing a performance with respect to pressure loss in the fluid flow and acoustic insertion losses (i.e., reduction in noise) that is better and/or comparable to that obtained with conventional larger and smaller silencer systems.

The various embodiments provide an air intake silencer system for a gas turbine system that is box-shaped with a modular design of vertical baffles spaced in parallel that are operative to receive a perpendicular flow of intake air and direct the intake air towards the compressor section of the gas turbine engine. The vertical baffles are shaped to obtain comparable performance, if not better performance in comparison to conventional silencer systems. For example, the vertical baffles can have a rounded profile at the intake air entrance side of the baffles in order to smooth out the flow of the air at the entrance side. This results in a uniform flow of the intake air, which reduces pressure losses at an intake air exit side of the baffles before the air enters the compressor. The vertical baffles can also have a tapered and angled profile at the intake air exit side of the baffles. The tapered and angled profile at the intake air exit side of the baffles enable the baffles to guide the intake air from the silencer to the compressor with low pressure losses and acoustic insertion losses. Also, it is noted that the tapered and angled profile at the intake air exit side of the baffles are different depending on the location of the baffle in relation to the air flow. However, the profile shape of the vertical baffles at the intake air entrance side and the intake air exit side can be symmetric across the center line of the silencer. For example, the vertical baffles at the intake air entrance side and the intake air exit side can be symmetric about a centrally disposed baffle. In one embodiment, the vertical baffles can include a plurality of layered compound bricks of acoustic silencing material that extend vertically and horizontally between the intake air exit side and the intake air exit side of the baffles.

With this configuration, the air intake silencer system of the various embodiments can operate in a limited confined space due to its box-shape and modular design that is associated with the vertical baffles. Further, the box-shape and modular design permits the air intake silencer system of the various embodiments to take the form of one of a number of unique polygonal shapes that can include, but are not limited to, a hexagon, a hexagonal prism, and a rectangular, in order to optimize the interior volume of a filtration system enclosure that operates cooperatively with the silencer system as part of the overall air intake system used in the gas turbine system.

Because the vertical baffle design is not complex, the air intake silencer system of the various embodiments can be fabricated from a plastic material or different material different than the conventional steel or aluminum. This reduces the weight of the air intake silencer system. The reduced weight and uncomplicated design make it easy and economical to manufacture the air intake silencer system of the various embodiments, while at the same time providing a performance with respect to pressure loss in the fluid flow and acoustic insertion losses that is better and/or comparable to that obtained with conventional larger and smaller silencer systems.

In accordance with one embodiment, an air intake silencer system for a gas turbine system is provided. The air intake silencer system comprises: a silencer housing having a pair of opposing ends with a first end closed and a second end opened to permit passage of air therethrough, and a pair of opposing sidewalls extending between the first end and the second end with each of the sidewalls operative to receive a perpendicular flow of intake air therethrough; and a silencer including a plurality of vertically, spaced baffles disposed within the silencer housing, each of the vertically, spaced baffles extending between the first end and the second end of the silencer housing, wherein the vertically, spaced baffles are operative to receive the perpendicular flow of intake air proximate the first end of the silencer housing and direct the intake air towards the second end of the silencer housing for passage therethrough.

In accordance with another embodiment, a gas turbine system is provided. The gas turbine system comprises: an air intake system to provide a flow of intake air; an air intake silencer system to reduce noise associated with the flow of intake transmitted through the air intake system, the air intake silencer system including: a silencer housing having a pair of opposing ends with a first end closed and a second end opened to permit passage of air therethrough, and a pair of opposing sidewalls extending between the first end and the second end with each of the sidewalls operative to receive a perpendicular flow of intake air therethrough from the air intake system; and a silencer having a plurality of vertical baffles spaced in parallel that are disposed within the silencer housing with a first end of the plurality of vertical baffles facing the first end of the silencer housing and a second end of the plurality of vertical baffles facing the second end of the silencer housing, each of the vertical baffles extending horizontally between the first end and the second end of the silencer housing, wherein the vertical baffles are operative to receive the perpendicular flow of intake air proximate the first end of the silencer housing and direct the intake air towards the second end of the silencer housing for passage therethrough; and a gas turbine engine including: a compressor operatively coupled to the air intake silencer system for receiving the intake air passing through the second end of the silencer housing; a combustor fluidly coupled to the compressor; and a turbine component operatively coupled to the compressor and the combustor.

DRAWINGS

The present invention will be better understood from reading the following description of non-limiting embodiments, with reference to the attached drawings, wherein below:

Figure 2:
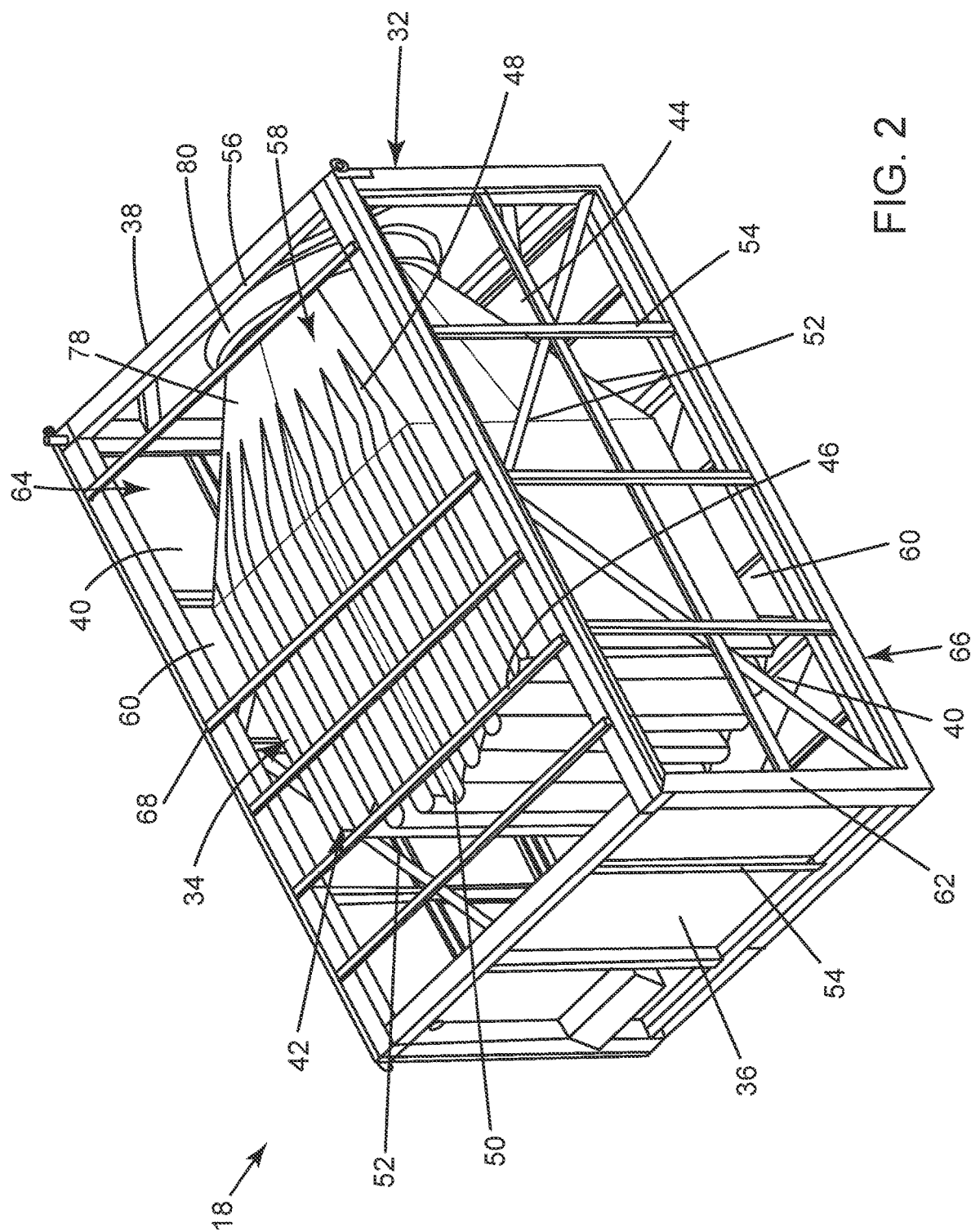
FIG. 2 shows a perspective view of the air intake silencer system depicted in FIG. 1 with a silencer housing and a silencer having vertical baffles spaced in parallel that are disposed within the housing according to an embodiment of the invention.
Figure 4:
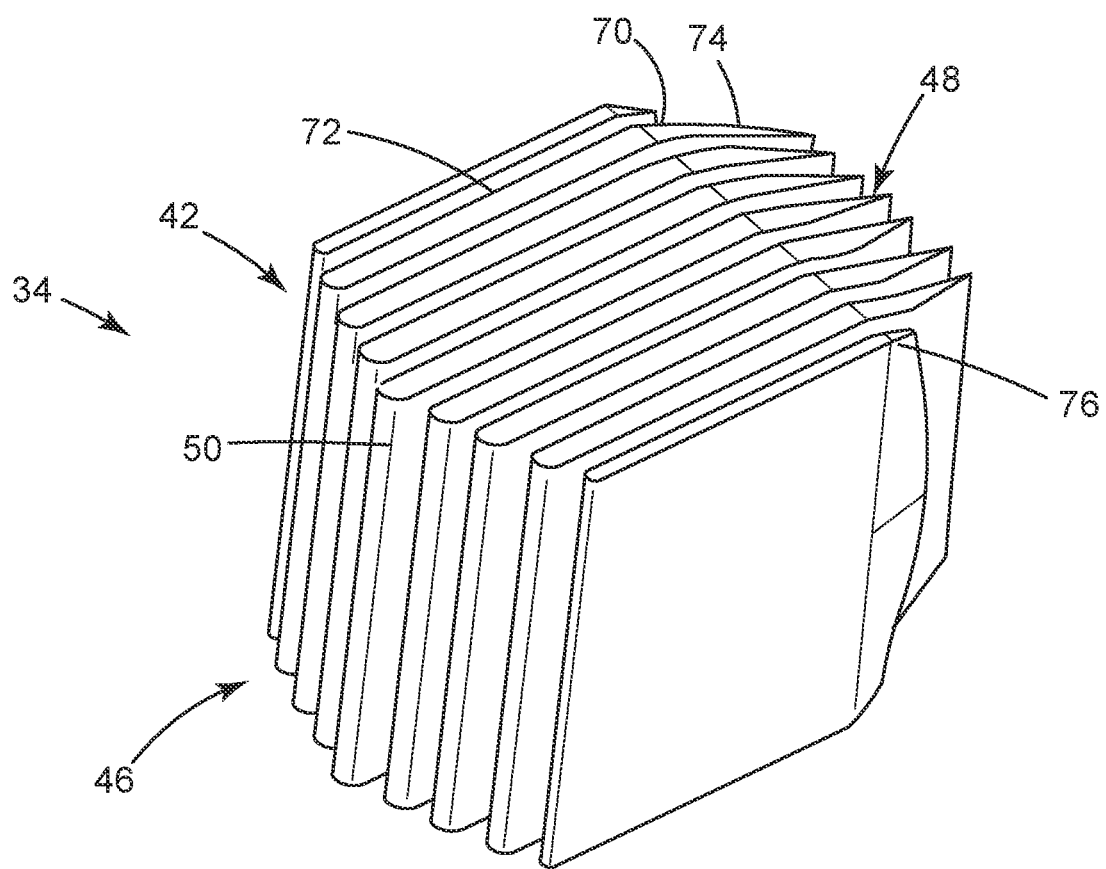
Figure 5:
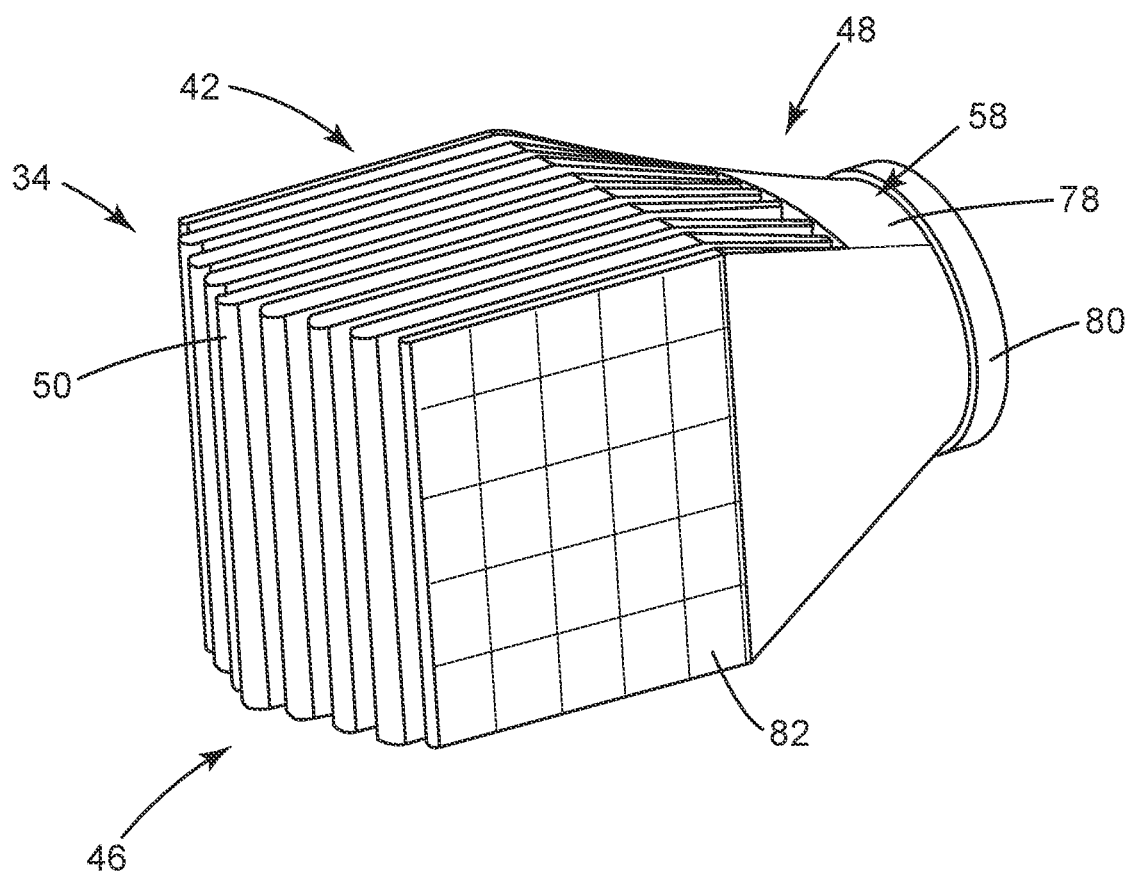

FIG. 4 shows a perspective view with still more details of the vertically, spaced baffles depicted in FIG. 2 without a transition component according to an embodiment of the invention; and FIG. 5 shows a perspective view of a silencer having vertical baffles with each baffle including a plurality of layered compound bricks of acoustic silencing material that extend vertically and horizontally between the intake air exit side and the intake air exit side of the baffle according to an embodiment of the invention.

DETAILED DESCRIPTION

Example embodiments of the present invention will be described more fully hereinafter with reference to the accompanying drawings, in which some, but not all embodiments are shown. Indeed, the present invention may be embodied in many different forms and should not be construed as limited to the embodiments set forth herein; rather, these embodiments are provided so that this disclosure will satisfy applicable legal requirements. For like numbers may refer to like elements throughout.

As indicated above, this disclosure relates generally to gas turbine systems, and more specifically, to an air intake silencer system having a box-shaped silencer with vertical baffles spaced in parallel for use with a gas turbine system. The box-shaped silencer of the various embodiments is suitable for use with all types of gas turbine combustion systems utilizing turbomachinery regardless of their application (e.g., land-based, marine-based, and aviation based applications). Gas turbine combustion systems using turbomachines that include, but are not limited to, aeroderivative gas turbines, marine gas turbines, ammonia-fueled gas turbines, hydrogen-fueled gas turbines, aviation gas turbines, heavy frame industrial gas turbines, and general combustion turbines are non-limiting examples of gas turbine combustion systems that can have a need to reduce noise at the intake air system. Thus, aspects of the various embodiments can have applicability to these types of gas turbine combustion systems.

Figure 1:
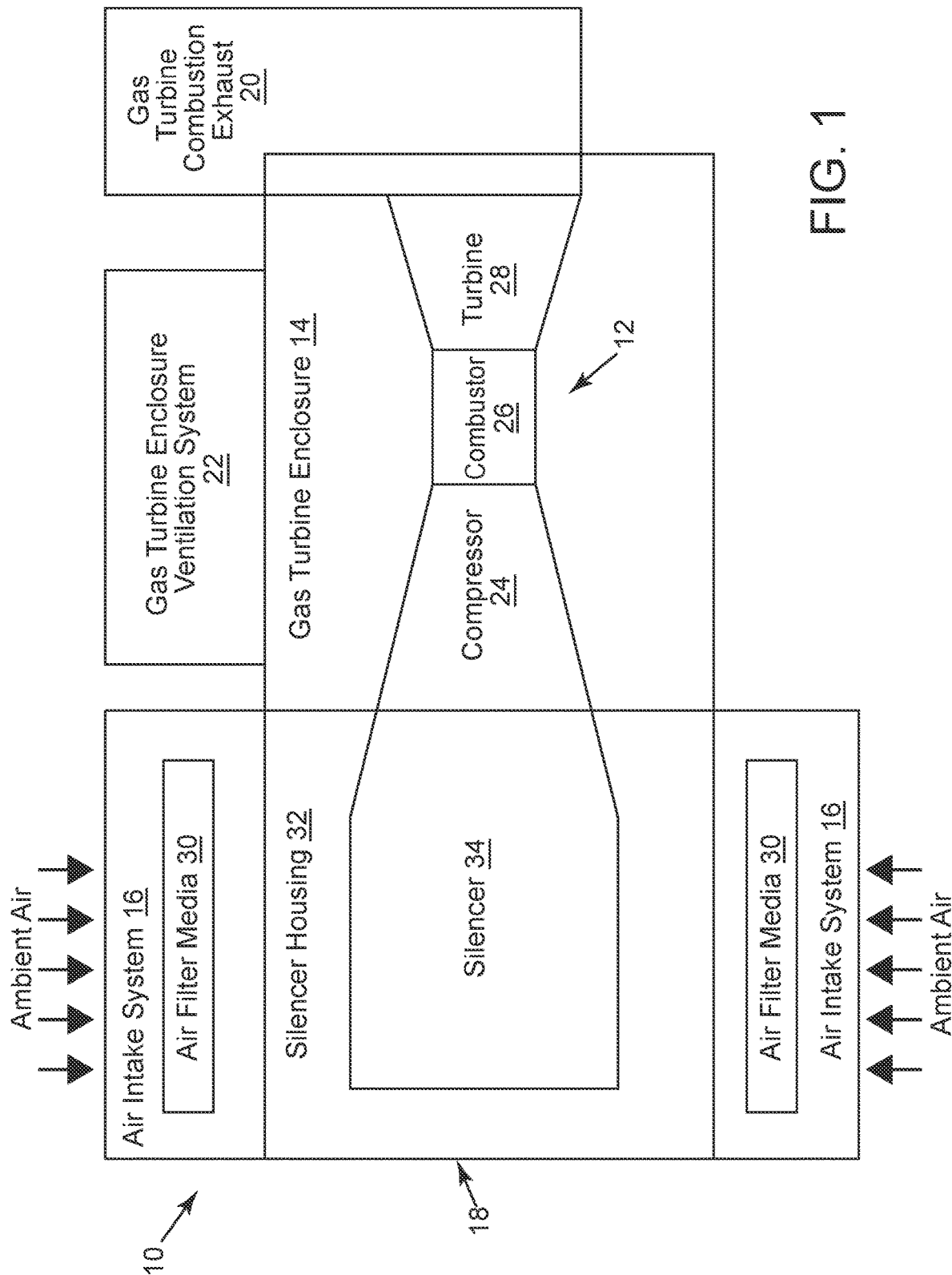
FIG. 1 shows a schematic of a gas turbine system according to an embodiment of the invention.

Turning now to the figures, FIG. 1 shows a schematic of a gas turbine system 10 according to an embodiment of the invention. As shown in FIG. 1, the gas turbine system 10 includes a gas turbine engine 12, a gas turbine enclosure 14 that houses the gas turbine engine 12, an air intake system 16 that provides filtered air to the gas turbine engine 12 for combustion, an air intake silencer system 18 that reduces the "noise" associated with a stream of inlet air transmitted through the air intake system, a gas turbine combustion exhaust 20 for releasing exhaust gases from the gas turbine engine 12, and a gas turbine enclosure ventilation exhaust system 22 to purge and ventilate heat and exhaust products from the gas turbine engine 12. The gas turbine system 10 of FIG. 1 may be any one of a number of different gas turbine systems such as those offered by the General Electric Company. In one embodiment, the gas turbine system can include an aeroderivative gas turbine system.

The gas turbine engine 12 can include a compressor 24, a combustor 26, and a turbine 28. In general, the compressor can compress an incoming flow of air. The compressor 24 can deliver the compressed flow of air to the combustor 26, where the compressed flow of air mixes with a compressed flow of fuel. The combustor 26 can ignite the air/fuel mixture to create a flow of combustion gases. The flow of combustion gases can be delivered to the turbine 28 to drive the turbine to produce mechanical work. The mechanical work produced in the turbine can drive the compressor 24 and an external load, such as an electrical generator or the like. The flow of combustion gases may be exhausted or otherwise disposed by the gas turbine combustion exhaust 20.

The gas turbine enclosure 14, which encloses the gas turbine engine 12, can isolate the gas turbine engine 12. In addition, the gas turbine enclosure 14 can include a number of different components that operate in conjunction with the gas turbine engine 12. For example, the gas turbine enclosure 14 can include piping for lube oil, NOx emissions, power augmentation, and the like. Other components can include, but are not limited to, a gas detection system and a fire detection and suppression system. Also, the gas turbine enclosure 14 can perform a number of different functions that contribute to the operation of the gas turbine engine 12. For example, the gas turbine enclosure 14 can serve as a sump for oil leaks from the gas turbine engine 12.

In one embodiment, the air intake system 16 can include a dual system in which two air intake systems are configured to provide intake air from an ambient environment to the compressor 24 of the gas turbine engine. Each air intake system 16 can include an inlet screen or an air filter house that includes one or more filter assemblies having air filter media 30 that removes moisture and/or particulate matter (such as dust, dirt, contaminants and/or debris) from the intake air channeled for supply to the compressor 24 of the gas turbine engine 12.

The air intake systems 16 can each have a dean air duct that receives the filtered air from the air filter media 30, The air in the clean air ducts can be divided into combustion intake air that goes to the compressor of the gas turbine engine 12, and ventilation inlet air that is supplied to the gas turbine enclosure 14. In particular, a combustion intake air duct can provide the combustion intake air to the compressor, while a ventilation inlet air bypass conduit can supply the ventilation inlet air to the gas turbine enclosure 14.

It is understood that the air intake systems 16 can be configured to include other components, and thus, the description of the air intake system as depicted FIG. 1 is not meant to be limiting. For example, the air filter house can be configured with a weather hood for minimizing weather elements (e.g., rain, snow, etc.) from entering the air filter house, heating or de-icing components to warm the stream of inlet air and/or components of the air filter house such as for example, the air filter media 30. Sensors (e.g., temperature sensors, pressure sensors, humidity sensors, flow sensors) can measure various conditions associated with the air filter house and its components, as well as conditions associated with the stream of intake air. Further, it is understood that other air intake system configurations are possible, and thus, the embodiment described and depicted with respect to FIG. 1 is not meant to be limiting to the embodiments described herein. For example, it is possible that the gas turbine system 10 depicted in FIG. 1 can have a single air intake system.

The air intake silencer system 18, which can be mounted to the air intake system 16 and the compressor 24, can receive the combustion intake air from each of air intake systems. In one embodiment, the air intake silencer system 18 can include a silencer housing 32 and a box-shaped silencer 34 disposed in the silencer housing. The air intake silencer system 18 is configured to direct the combustion intake air towards the compressor 24 of the turbine engine 12 while reducing the "noise" associated with the stream of intake air to required levels. Further details of the air intake silencer system 18 including the silencer housing 32 and the box-shaped silencer 34 are presented below.

The gas turbine enclosure ventilation exhaust system 22 can include one or more ventilation fans that operate to generate an air flow to purge the gas turbine enclosure 14 of heat and exhaust products from the gas turbine engine 12. In addition, the gas turbine enclosure ventilation exhaust system 22 can include a damper that controls the flow of air containing the heat and exhaust products from the gas turbine engine 12 and the gas turbine enclosure 14. In particular, the damper can direct the gas turbine enclosure ventilation exhaust air to the air intake system 16 and/or venting to ambient.

It is understood that the gas turbine system 10 can include a number of other components not depicted in FIG. 1. For example, the gas turbine system 10 can include a shaft operatively coupled to the compressor 24 and the turbine 28 of the gas turbine engine 12. To this extent, the shaft may be connected to a load such as for example, an electrical generator for power generation applications. Also, a controller can be utilized to control the operation of the gas turbine system 10. Other components can include, but are not limited to, an exhaust silencer to reduce the noise about the gas turbine combustion exhaust 20 and a ventilation silencer to reduce the noise about the gas turbine enclosure ventilation exhaust system 22.

FIG. 2 shows a perspective view of the air intake silencer system 18 depicted in FIG. 1 with the silencer housing 32 and the box-shaped silencer 34. The silencer housing 32 of the various embodiments can take the form of an enclosure, a container, a chamber, a frame structure, or the like. As shown in FIG. 2, the silencer housing 32 can have a pair of opposing ends with a first end closed 36 and a second end 38 opened to permit passage of air therethrough, and a pair of opposing sidewalls 40 extending between the first end 36 and the second end 38. The opposing sidewalls 40 of the silencer housing 32 can be opened such that each of the sidewalls are operative to receive a perpendicular flow of intake air therethrough from one of the dual aspect air intake systems 16. For example, the sidewalls 40 can receive a flow of combustion intake air from one of the air intake systems 16 (FIG. 1) that is configured to direct intake air to that sidewall. The box-shaped silencer 34 receives the combustion intake air entering the sidewalls 40 of the silencer housing 32 proximate the first end 36 and directs it to the second end 38 wherein there is an opening in fluid communication with the compressor 24. As used herein, the term "in fluid communication" means that there is a passage that allows a fluid to flow. In this manner, the second end 38 of the box-shaped silencer 34 can direct the flow of combustion intake air towards the compressor 24 of the gas turbine engine 12.

The silencer housing 32 and the opposing ends 36 and 38, and the sidewalls 40 can be configured in one of a number of ways. In one embodiment, the silencer housing 32 can be configured to have a rectangular or a square geometry. In addition, the ends 36 and 38 can be supported by vertical extending members 54. Although not illustrated in FIG. 2, it is understood that horizontal extending members can be used in addition to, or in place of the vertical extending members 54 at the ends 36 and 38.

The opened end 38 can have an opening 56 formed therethrough. In this manner, the silencer 34 can mounted in the opening 56 such that a transition component 58 of the silencer is in fluid communication with the opening and the compressor 24 of the turbine engine 12. As shown in FIG. 2, the transition component 58 of the silencer 34 can be downstream of a second end 48 of a plurality of vertical baffles 42 spaced in parallel. As used herein, "downstream" and "upstream" are terms that indicate a direction relative to the flow of a fluid, such as the working fluid through the gas turbine system, for example, the flow of air through the air intake system or through one of the components of a gas turbine engine. The term "downstream" corresponds to the direction of flow of the fluid, and the term "upstream" refers to the direction opposite to the flow.

The opposing sidewalls 40 of the silencer housing 32 can include a screen 60 that permits the flow of the intake air from the air intake system 16 to flow therethrough. In addition, the screen 60 of the sidewalls 40 of the silencer housing 32 can be used to remove foreign object debris from passing therethrough into the silencer housing 32 and the silencer 34 which could result in damage to these components as well as those associated with the gas turbine engine 12. As shown in FIG. 2, the screen 60 of the sidewalls 40 can be supported by vertical extending members 54 and horizontal extending members 62.

FIG. 2 shows that the silencer housing 32 can include additional structural members that can contribute to the shape and support of the housing. For example, a top region 64 and a bottom region 66 of the silencer housing 32 can include a plurality of spaced structural members 68 that extend across the width of these regions. The structural members 68, like the vertical extending members 54 and the horizontal extending members 62 of the other regions of the silencer housing 32 can include, but are not limited to, rods, support legs, struts, and the like. Although FIG. 2 shows the top region 64 and the bottom region 66 having spaced structural members 68 that extend the width of these regions, it is understood that the structural members 68 can extend in a lengthwise direction, in place of or used in addition to those width extending structural members 68.

The box-shaped silencer 34 can include a plurality of vertical baffles or panels 42 spaced in parallel that are disposed within an interior 44 of the silencer housing 32. Each of the plurality of vertical baffles can be straight and co-planar with the other baffles. In one embodiment, the plurality of vertically, spaced baffles 42 can have a first end 46 facing the first end 36 of the silencer housing 32 (i.e., the intake air entrance side of the baffles) and a second end 48 facing the second end 38 of the silencer housing 32 (i.e., the intake air exit side of the baffles). As shown in FIG. 2, each of the vertically, spaced baffles 42 can extend horizontally between the first end 36 and the second end 38 of the silencer housing 32. To this extent, the baffles 42 are operative to receive the perpendicular flow of intake air proximate the first end 36 of the silencer housing 32 and direct the intake air towards the second end 38 of the silencer housing for passage therethrough to the compressor 24.

In one embodiment, the vertically, spaced baffles 42 can include acoustic liner layers having acoustic silencing material for substantially attenuating sound created by the intake air provided to the gas turbine engine 12 by the air intake system 16, For example, the acoustic liner layers can be applied to surfaces of the baffles 42 that the intake air flows over before entering into the compressor 24 of the turbine engine 12. It is understood that the silencer 34 can have the acoustic liner layers applied to other components in addition to the baffles 42. For example, the acoustic liner layers can be applied to surfaces of the transition component 58. The acoustic silencing material that forms the acoustic liner layers that can be applied to the baffles 42 and the transition component 58 may include any conventional liner layer material for attenuating sound including, but not limited to; high density foam (e.g., melamine foam, polyurethane foam), insulated vinyl, acoustic boards, fiberglass and other similar types of insulating, soundproofing, and sound absorption material.

In one embodiment, the baffles 42 can include a plastic material. In general, a wide variety of plastic material is suitable for use as long as the material meets operating condition requirements such as temperature, operating life time, vibration, environmental corrosion, etc. The use of a plastic material for the baffles 42 allows the silencer 34 to have a reduced weight in comparison to conventional silencers. The reduced weight and uncomplicated design of the baffles 42 makes the silencer 34 easier and economical to manufacture. In addition, the plastic makes the baffles suitable for manufacturing using additive manufacturing technologies such as, but not limited to, three-dimensional printing.

It is understood that the baffles can be made from other materials besides plastic. A non-exhaustive list of materials that can be used include composites, metallic materials, and metallic/non-metallic composite materials.

Figure 3:
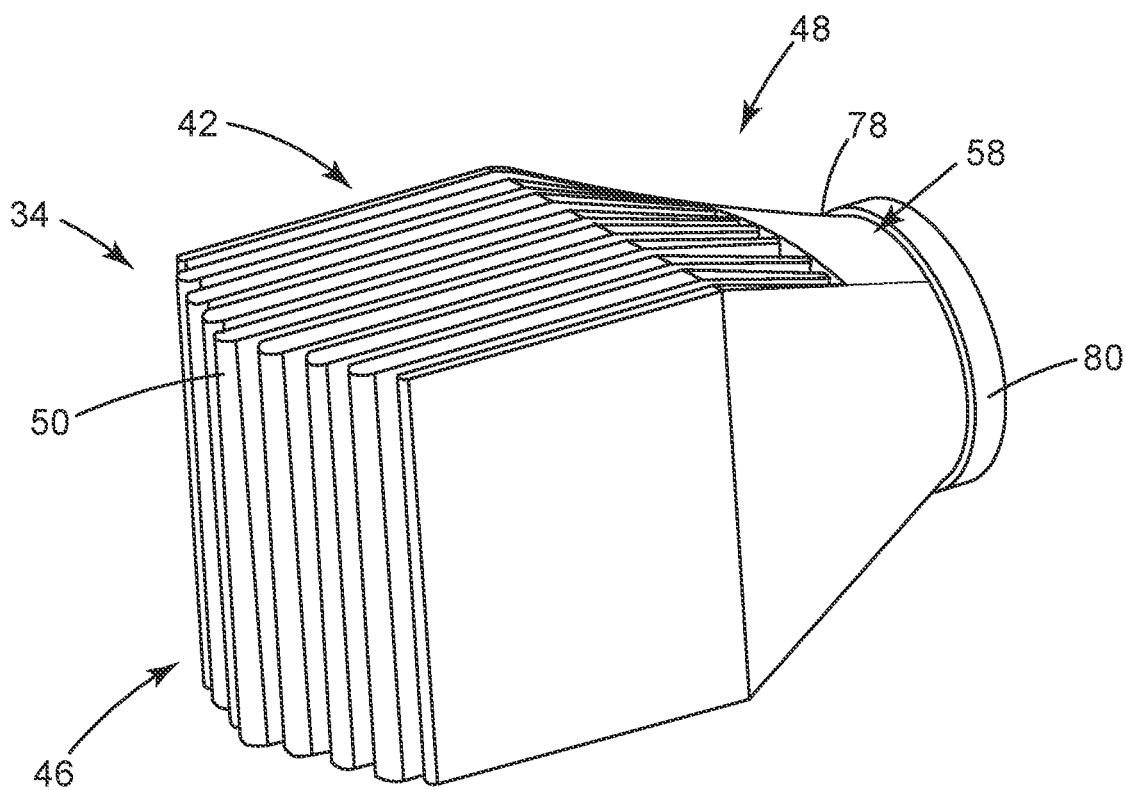
FIG. 3 shows a perspective view with further details of the vertically, spaced baffles depicted in FIG. 2 according to an embodiment of the invention.

As shown in FIG. 2, as well as FIGS. 3-5, the plurality of vertically, spaced baffles 42 can be symmetrically shaped. For example, the first end 46 and the second end 48 of the plurality of vertically, spaced baffles 42 are symmetrically shaped about a centrally disposed baffle 50 or a center vertical plane of the silencer. In one embodiment, as shown in FIG. 2, the distance from the first end 46 of the plurality of vertically, spaced baffles 42 to the first end 36 of the silencer housing 32 can increase gradually from the centrally disposed baffle 50 to each successive baffle moving towards both of the opposing sidewalls 40 of the silencer housing 32. Similarly, the distance from the second end 48 of the plurality of vertically, spaced baffles 42 to the second end 38 of the silencer housing 32 can increase gradually from the centrally disposed baffle 50 to each successive baffle moving towards both of the opposing sidewalls 40 of the silencer housing 32. The symmetry of the baffles 42 as well as their capability for modular implementation contribute to the aforementioned benefit of the silencer 34 that pertains to reduced weight and lower economic cost for manufacture thereof. Further details of the plurality of vertically, spaced baffles 42 at both the first end 46 and the second end 48 are discussed below in more detail with respect to FIGS. 3-5.

FIG. 2 shows that the air intake silencer 18 can also include a plurality of struts 52 to stabilize the box-shaped silencer 34 within the silencer housing 32. In one embodiment, the struts 52 can be coupled to the pairs of opposing ends 36 and 38 and the sidewalls 40 of the silencer housing 32, and the side surfaces of the outermost baffles of the plurality of vertically, spaced baffles 42. In one embodiment, the struts 52 can be located on the interior side of the sidewalls 40 of the silencer housing 32. In this manner, the struts 52 can serve as structural components to the silencer housing 32 and the baffles 42. In particular, the struts 52 may be coupled to the pairs of opposing ends 36 and 38 and the sidewalls 40 of the silencer housing 32, and the outer side surfaces of the plurality of vertically, spaced baffles 42 by any mechanical coupling technique including, but not limited, mechanical fasteners, welding, brazing, tying, etc. In another embodiment, the struts 52 can include seats for engaging with the pairs of opposing ends 36 and 38 and the sidewalls 40 of the silencer housing 32, and the outer side surfaces of the plurality of vertically, spaced baffles 42, obviating the need for permanently coupling (e.g., welding, brazing).

FIGS. 3-5 show further details of the silencer 34 including the plurality of vertically, spaced baffles 42 and the transition component 58. For example, FIGS. 3-5 show that the second end 48 of the plurality of vertically, spaced baffles 42 are angled sharply inwards towards the centrally disposed baffle 50. Although these figures do not show the baffles 42 in relation to the sidewalls 40 of the silencer housing 32, the second end 48 of each of the baffles moving from both of the opposing sidewalls 40 of the silencer housing 32 towards the centrally disposed baffle 50 are angled sharply inwards towards the centrally disposed baffle.

FIG. 4, which shows a clearer view of the second end 48 of the baffles 42, depicts the angling of the second end of the baffles. As shown in FIG. 4, the second end 48 of each the plurality of vertically, spaced baffles 42 has a tapered profile. In one embodiment, the second end 48 of each the baffles 42 can have a first section 70 that is generally planar with a central portion 72 of a horizontally extending region of the baffle and a second section 74 that is angled sharply.

FIG. 4 further shows that each of the first section 70 and the second section 74 the baffles 42 has a downward sloping inclination. In one embodiment, these sections of the baffles 42 each comprise a gradual downward section that can start at a location 76 where the central portion 72 of the horizontally extending region of the baffle abuts the first section 70. For example, the gradual downward sloping section of the first section 70 can gradually slope downward from the central portion 72 of the corresponding horizontally extending region of the baffle, and the gradual downward sloping section of the second section 74 can gradually slope downward from the first section 70. The downward sloping inclination at the second end 48 of the baffles is beneficial in that it provides a uniform flow (including uniform flow velocity) of the intake air at the entrance of the compressor 24. Not only is the flow of the intake air uniform, but the end tails of the baffles 42 also serve to provide the flow to the entrance of the compressor 24 in a smooth manner with low pressure losses.

These features at the second end 48 of the baffles 42 complement the benefits provided by the profile of the first end 46 of the baffles 42. For example, the vertical baffles at the first end 46, which is proximate the intake air entrance side of the baffles, can have a rounded profile in order to smooth out the flow of the air at the entrance side. This results in a uniform flow of the intake air, which reduces pressure losses at the second end 48 of the baffles (i.e., the intake air exit side of the baffles) before the air enters the compressor 24. The tapered and angled profile at the second end 48 of the baffles 42 enables the silencer 34 to guide the intake air to the compressor 24 with low pressure losses and acoustic insertion losses.

As noted above, the silencer 34 includes a transition component 58 that is mounted in the opening 56 in the silencer housing 32 and is in fluid communication with the compressor 24 of the turbine engine 12. To this extent, as shown in FIG. 2, the transition component 58 is operatively coupled to the second end 48 of the plurality of vertically, spaced baffles 42 and the second end 38 of the silencer housing 32. This allows the transition component 58 to direct the intake air towards the second end 38 of the silencer housing 32. In particular, the transition component can aid in narrowing the flow path of the intake air as it flows toward the compressor 24.

FIGS. 2, 3 and 5 show further details of the transition component 58. As shown in FIGS. 2, 3 and 5, the transition component 58 can include a tapered portion 78 positioned adjacent the second end 48 of the baffles 42, and a cylindrical portion 80 positioned adjacent the tapered portion 78. The tapered portion 78 can narrow the flow path of the intake air. In this manner, the flow of the intake air can be substantially narrow such that it can flow directly to the cylindrical portion 80 and to the opening 56 formed in the second end 38 of the silencer housing 32 into the compressor 24 with no further directional conversion or narrowing of the flow path of the intake air. In one embodiment, the tapered portion 78 may include a substantially frusto-conical body shape. In an alternative embodiment, the tapered portion 78 may include any conventional body shape including substantially tapered sidewalls to direct intake air to the compressor 24 of the gas turbine engine 12.

Although the various embodiments as shown in FIGS. 2-5 depict the silencer 34 has box-shaped, it is understood that the silencer housing 32 and the silencer including the plurality of vertically, spaced baffles 42 can be shaped to other polygonal structures. Accordingly, the various embodiments are not meant to be limited to the box-shaped configuration of the silencer housing 32 and the baffles 42 of the silencer 34 that is depicted in FIGS. 2-5. In particular, the silencer housing 32 and the baffles 42 of the silencer 34 can be configured to have the shape of any one of a number of polygonal shapes. For example, the silencer housing 32 and the baffles 42 of the silencer 34 can have a shape that includes, but is not limited to, a hexagon, a hexagonal prism, and a rectangular. All of these shapes are suited for implementation with a plurality of vertically, spaced baffles that can receive a perpendicular flow of intake air and direct it towards the compressor of the gas turbine engine. Further, these different polygonal shapes are suited for implementation in a limited confined space due to the modular design that is associated with the vertical baffles. It is understood that for these implementations, the baffles 42 would be sized differently to correspond with the polygonal shape used to form the baffles.

Also, it is understood that the vertically, spaced baffles 42 of the silencer 34 can be configured differently than the embodiments depicted in FIGS. 2-4. For example, the baffles 42 can be arranged as layered compound bricks of acoustic silencing material. FIG. 5 shows a perspective view of vertical baffles 42 for an air intake silencer system with each baffle including a plurality of layered compound bricks of acoustic silencing material 82. As shown in FIG. 5, the plurality of layered compound bricks of acoustic silencing material 82 can extend vertically and horizontally between the first end 46 of the baffles 42 and the second end 48 of the baffles. The bricks of acoustic silencing material 82 can include any of the aforementioned materials.

The bricks of acoustic silencing material 82 can be coupled to each other in one of a number of known coupling approaches. For example, the bricks of acoustic silencing material 82 can be coupled together via mating interlock structures. Other approaches can include, but are not limited to, a structural rib or support, a mating joint, a lockable coupling, such as mating interlock structures (e.g., interlocking male and female joint portions), mating rail portions, mating dovetail joints, mating hook and slot joints, mating latches, mating snap-fit couplings, or any combination thereof. In this manner, the bricks of acoustic silencing material 82 can be coupled to form rows and columns of bricks of acoustic silencing material 82 for each of the baffles 42 in the silencer 34.

It is understood that the silencer 34 and the silencer housing 32 are described with respect to use with the air intake system 16, it is understood that the various embodiments can have applicability in other areas of a gas turbine system where it is desired to remove noise. For example, the various embodiments may have applicability with the silencers that can be used with the gas turbine combustion exhaust and the gas turbine enclosure ventilation exhaust system.

Accordingly, it should be apparent that the box-shaped silencer of the various embodiments as described herein is amenable for industrial application in that it relates to the technical field of air intake silencers for gas turbine systems, and presents a solution to a technical problem that includes pressure losses that can develop in the fluid flow of intake air from an air intake system to a compressor section of a gas turbine engine. The technical effects of the box-shaped silencer of the various embodiments includes a silencer that provides lower pressure drop, a silencer that is smaller and suitable for placement in confined spaces, and a silencer that is easily manufacturable in a cost-effective manner.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. For example, parts, components, steps and aspects from different embodiments may be combined or suitable for use in other embodiments even though not described in the disclosure or depicted in the figures. Therefore, since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below. For example, references to "one embodiment" of the present invention are not intended to be interpreted as excluding the existence of additional embodiments that also incorporate the recited features.

In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. The terms "substantially," "generally," and "about" indicate conditions within reasonably achievable manufacturing and assembly tolerances, relative to ideal desired conditions suitable for achieving the functional purpose of a component or assembly. Further, the limitations of the following claims are not written in means-plus-function format and are not intended to be interpreted as such, unless and until such claim limitations expressly use the phrase "means for" followed by a statement of function void of further structure.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings, such terms are intended to be inclusive in a manner similar to the term "comprising" as "comprising" is interpreted when employed as a transitional word in a claim. That is, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

An air intake silencer system for a gas turbine system, comprising: a silencer housing having a pair of opposing ends with a first end closed and a second end opened to permit passage of air therethrough, and a pair of opposing sidewalls extending between the first end and the second end with each of the sidewalls operative to receive a perpendicular flow of intake air therethrough; and a silencer including a plurality of vertically, spaced baffles disposed within the silencer housing, each of the vertically, spaced baffles extending between the first end and the second end of the silencer housing, wherein the vertically, spaced baffles are operative to receive the perpendicular flow of intake air proximate the first end of the silencer housing and direct the intake air towards the second end of the silencer housing for passage therethrough.

The air intake silencer system of the preceding clause, wherein a first end and a second end of the plurality of vertically, spaced baffles are symmetrically shaped about a centrally disposed baffle or a center vertical plane of the silencer.

The air intake silencer system of any of the preceding clauses, wherein a distance from the first end of the plurality of vertically, spaced baffles to the first end of the silencer housing increases gradually from the centrally disposed baffle to each successive baffle moving towards both of the opposing sidewalls of the silencer housing.

The air intake silencer system of any of the preceding clauses, wherein a distance from the second end of the plurality of vertically, spaced baffles to the second end of the silencer housing increases gradually from the centrally disposed baffle to each successive baffle moving towards both of the opposing sidewalls of the silencer housing.

The air intake silencer system of any of the preceding clauses, wherein the second end of the plurality of vertically, spaced baffles moving from both of the opposing sidewalls of the silencer housing towards the centrally disposed baffle are angled sharply inwards towards the centrally disposed baffle.

The air intake silencer system of any of the preceding clauses, wherein the first end of each the plurality of vertically, spaced baffles comprises a rounded profile.

The air intake silencer system of any of the preceding clauses, wherein the second end of each the plurality of vertically, spaced baffles comprises a tapered profile.

The air intake silencer system of any of the preceding clauses, wherein the second end of each the plurality of vertically, spaced baffles comprises a first section that is generally planar with a central portion of a horizontally extending region of the baffle and a second section that is angled sharply.

The air intake silencer system of any of the preceding clauses, wherein the first section and the second section of each of the plurality of vertically, spaced baffles comprises a gradual downward sloping section, wherein the gradual downward sloping section of the first section gradually slopes downward from the central portion of the corresponding horizontally extending region of the baffle, and the gradual downward sloping section of the second section gradually slopes downward from the first section.

The air intake silencer system of any of the preceding clauses, further comprising a transition component that operatively couples the second end of the plurality of vertically, spaced baffles with the second end of the silencer housing, wherein the transition component is adapted to direct the intake air towards the second end of the silencer housing.

The air intake silencer system of any of the preceding clauses, wherein the transition component comprises a tapered portion operatively coupled to the second end of the plurality of vertically, spaced baffles and a cylindrical portion operatively coupled to the second end of the silencer housing, wherein a width of the tapered portion decreases gradually towards the cylindrical portion.

The air intake silencer system of any of the preceding clauses, wherein each of the plurality of vertically, spaced baffles comprises a plurality of layered compound bricks of acoustic silencing material, wherein the plurality of layered compound bricks of acoustic silencing material extend vertically and horizontally between the first end and the second end of the silencer housing.

A gas turbine system, comprising: an air intake system to provide a flow of intake air; an air intake silencer system to reduce noise associated with the flow of intake transmitted through the air intake system, the air intake silencer system including: a silencer housing having a pair of opposing ends with a first end closed and a second end opened to permit passage of air therethrough, and a pair of opposing sidewalls extending between the first end and the second end with each of the sidewalls operative to receive a perpendicular flow of intake air therethrough from the air intake system; and a silencer having a plurality of vertical baffles spaced in parallel that are disposed within the silencer housing with a first end of the plurality of vertical baffles facing the first end of the silencer housing and a second end of the plurality of vertical baffles facing the second end of the silencer housing, each of the vertical baffles extending horizontally between the first end and the second end of the silencer housing, wherein the vertical baffles are operative to receive the perpendicular flow of intake air proximate the first end of the silencer housing and direct the intake air towards the second end of the silencer housing for passage therethrough; and a gas turbine engine including: a compressor operatively coupled to the air intake silencer system for receiving the intake air passing through the second end of the silencer housing; a combustor fluidly coupled to the compressor; and a turbine component operatively coupled to the compressor and the combustor.

The gas turbine system of the preceding clause, wherein the first end and second end of the plurality of vertical baffles are symmetrically shaped about a centrally disposed baffle or a center vertical plane of the silencer.

The gas turbine system of any of the preceding clauses, wherein the first end of each the plurality of vertical baffles comprises a rounded profile.

The gas turbine system of any of the preceding clauses, wherein the second end of each the plurality of vertical baffles comprises a tapered profile.

The gas turbine system of any of the preceding clauses, wherein the second end of each the plurality of vertical baffles comprises a first section that is generally planar with a central portion of the horizontally extending region of the baffle and a second section that is angled sharply.

The gas turbine system of any of the preceding clauses, wherein the first section and the second section of each of the plurality of vertically, spaced baffles comprises a gradual downward sloping section, wherein the gradual downward sloping section of the first section gradually slopes downward from the central portion of the corresponding horizontally extending region of the baffle, and the gradual downward sloping section of the second section gradually slopes downward from the first section.

The gas turbine system of any of the preceding clauses, wherein each of the plurality of vertical baffles comprises a plurality of layered compound bricks of acoustic silencing material, wherein the plurality of layered compound bricks of acoustic silencing material extend vertically and horizontally between the first end and the second end of the silencer housing.

The gas turbine system of any of the preceding clauses, wherein the air intake system, the air intake silencer system and the gas turbine engine form part of an aeroderivative gas turbine system.

What is claimed is:

1. An air intake silencer system for a gas turbine system, comprising:
   a silencer housing having a pair of opposing ends with a first end closed and a second end opened to permit passage of air therethrough, and a pair of opposing sidewalls extending between the first end and the second end with each of the sidewalls operative to receive a perpendicular flow of intake air therethrough;
   a silencer including a plurality of vertically spaced baffles disposed within the silencer housing, each of the vertically spaced baffles having a first end that faces the first end of the silencer housing, an opposing second end that faces the second end of the silencer housing, and opposing side surfaces between the first end and the second end, with each side surface oriented to face one of the pair of opposing sidewalls of the silencer housing, the plurality of vertically spaced baffles extending between the first end and the second end of the silencer housing, with each vertically spaced baffle straight and co-planar along a horizontal direction with other baffles of the plurality of vertically spaced baffles, wherein a first end of the plurality of vertically spaced baffles facing the first end of the silencer housing defines an intake air entrance side of the silencer and a second end of the plurality of vertically spaced baffles facing the second end of the silencer housing defines an intake air exit side of the silencer, with the side surfaces of the baffles closest to each of the opposing sidewalls of the silencer housing operative to receive the perpendicular flow of intake air, direct the intake air towards the intake air entrance side of the silencer, the intake air entering the intake air entrance side, and flowing between the plurality of vertically spaced baffles towards the intake air exit side of the silencer for passage through the second end of the silencer housing; and
   a transition component that operatively couples the second end of the plurality of vertically spaced baffles with the second end of the silencer housing, wherein the transition component extends from the second end of the plurality of vertically spaced baffles to the second end of the silencer housing to direct the intake air towards the second end of the silencer housing, wherein the second end of the plurality of vertically spaced baffles defining the intake air exit side of the silencer extends into the transition component, wherein the second end of each of the vertically spaced baffles extends into the transition component.

2. The air intake silencer system according to claim 1, wherein a profile of the plurality of vertically spaced baffles at the first end and the second end of the plurality of vertically spaced baffles are symmetrically shaped about a centrally disposed baffle or a center vertical plane of the silencer.

3. The air intake silencer system according to claim 2, wherein a distance from the first end of the plurality of vertically spaced baffles to the first end of the silencer housing increases gradually from the centrally disposed baffle to each successive baffle moving towards both of the opposing sidewalls of the silencer housing.

4. The air intake silencer system according to claim 2, wherein a distance from the second end of the plurality of vertically spaced baffles to the second end of the silencer housing increases gradually from the centrally disposed baffle to each successive baffle moving towards both of the opposing sidewalls of the silencer housing.

5. The air intake silencer system according to claim 2, wherein the second end of each of the plurality of vertically spaced baffles moving from both of the opposing sidewalls of the silencer housing towards the centrally disposed baffle are individually angled sharply inwards towards the centrally disposed baffle.

6. The air intake silencer system according to claim 1, wherein the first end of each of the plurality of vertically spaced baffles comprises a rounded profile.

7. The air intake silencer system according to claim 1, wherein the second end of each of the plurality of vertically spaced baffles comprises a tapered profile.

8. The air intake silencer system according to claim 7, wherein the second end of each of the plurality of vertically spaced baffles comprises a first section that is generally planar with a central portion of a horizontally extending region of each baffle and a second section that is angled sharply.

9. The air intake silencer system according to claim 8, wherein the first section and the second section of each of the plurality of vertically spaced baffles comprises a gradual downward sloping section, wherein the gradual downward sloping section of the first section gradually slopes downward from the central portion of the corresponding horizontally extending region of each baffle, and the gradual downward sloping section of the second section gradually slopes downward from the first section.

10. The air intake silencer system according to claim 1, wherein the transition component comprises a tapered portion operatively coupled to the second end of the plurality of vertically spaced baffles and a cylindrical portion operatively coupled to the second end of the silencer housing, wherein a width of the tapered portion decreases gradually towards the cylindrical portion.

11. The air intake silencer system according to claim 1, wherein each of the plurality of vertically spaced baffles comprises a plurality of layered compound bricks of acoustic silencing material, wherein the plurality of layered compound bricks of acoustic silencing material extend vertically and horizontally between the first end and the second end of the silencer housing.

12. A gas turbine system, comprising:
   an air intake system to provide a flow of intake air;
   an air intake silencer system to reduce noise associated with the flow of intake transmitted through the air intake system, the air intake silencer system including:
      a silencer housing having a pair of opposing ends with a first end closed and a second end opened to permit passage of air therethrough, and a pair of opposing sidewalls extending between the first end and the second end with each of the sidewalls operative to receive a perpendicular flow of intake air therethrough from the air intake system; and
      a silencer having a plurality of vertical baffles spaced in parallel that are disposed within the silencer housing with a first end of the plurality of vertical baffles facing the first end of the silencer housing and a second end of the plurality of vertical baffles facing the second end of the silencer housing, each of the plurality of vertical baffles having a first end that faces the first end of the silencer housing, an opposing second end that faces the second end of the silencer housing, and opposing side surfaces between the first end and the second end, with each side surface oriented to face one of the pair of opposing sidewalls of the silencer housing, the plurality of vertical baffles extending horizontally between the first end and the second end of the silencer housing, with each vertical baffle straight and co-planar along a horizontal direction with other baffles of the plurality of vertical baffles, wherein the first end of the plurality of vertical baffles facing the first end of the silencer housing defines an intake air entrance side of the silencer and the second end of the plurality of vertically spaced baffles facing the second end of the silencer housing defines an intake air exit side of the silencer, with the side surfaces of the vertical baffles closest to each of the opposing sidewalls of the silencer housing operative to receive the perpendicular flow of intake air, direct the intake air towards the intake air entrance side of the silencer, the intake air entering the intake air entrance side, and flowing between the plurality of vertical spaced baffles towards the intake air exit side of the silencer for passage through the second end of the silencer housing, wherein the silencer further comprises a transition component extending from the second end of the plurality of vertical baffles towards the second end of the silencer housing, wherein the second end of the plurality of vertical baffles defining the intake air exit side extends into the transition component, wherein the second end of each of the vertically spaced baffles extends into the transition component; and a gas turbine engine including:
  a compressor operatively coupled to the air intake silencer system for receiving the intake air passing through the second end of the silencer housing;
  a combustor fluidly coupled to the compressor; and
  a turbine component operatively coupled to the compressor and the combustor.

13. The gas turbine system according to claim 12, wherein a profile of the plurality of vertical baffles at the first end and the second end of the plurality of vertical baffles are symmetrically shaped about a centrally disposed baffle or a center vertical plane of the silencer.

14. The gas turbine system according to claim 12, wherein the first end of each of the plurality of vertical baffles comprises a rounded profile.

15. The gas turbine system according to claim 12, wherein the second end of each of the plurality of vertical baffles comprises a tapered profile.

16. The gas turbine system according to claim 15, wherein the second end of each of the plurality of vertical baffles comprises a first section that is generally planar with a central portion of a horizontally extending region of each baffle and a second section that is angled sharply.

17. The gas turbine system according to claim 16, wherein the first section and the second section of each of the plurality of vertical baffles comprises a gradual downward sloping section, wherein the gradual downward sloping section of the first section gradually slopes downward from the central portion of the corresponding horizontally extending region of each baffle, and the gradual downward sloping section of the second section gradually slopes downward from the first section.

18. The gas turbine system according to claim 12, wherein each of the plurality of vertical baffles comprises a plurality of layered compound bricks of acoustic silencing material, wherein the plurality of layered compound bricks of acoustic silencing material extend vertically and horizontally between the first end and the second end of the silencer housing.

19. The gas turbine system according to claim 12, wherein the air intake system, the air intake silencer system and the gas turbine engine form part of an aeroderivative gas turbine system.

\* \* \* \* \*